US007871460B2

(12) United States Patent
Wardle

(10) Patent No.: US 7,871,460 B2
(45) Date of Patent: Jan. 18, 2011

(54) SYSTEM AND METHOD FOR A MOVING BED ADSORBER FOR CONTAMINANT REMOVAL

(75) Inventor: Trevor Wardle, Ashland, KY (US)

(73) Assignee: TW Environmental, Inc., Ashland, KY (US)

( * ) Notice: Subject to any disclaimer, the term of this patent is extended or adjusted under 35 U.S.C. 154(b) by 198 days.

(21) Appl. No.: 12/036,224

(22) Filed: Feb. 23, 2008

(65) Prior Publication Data

US 2008/0202338 A1 Aug. 28, 2008

Related U.S. Application Data

(60) Provisional application No. 60/902,814, filed on Feb. 23, 2007, provisional application No. 60/994,921, filed on Sep. 24, 2007.

(51) Int. Cl.
*B01D 53/06* (2006.01)
(52) U.S. Cl. .............................. 96/123; 96/134; 96/139; 96/150; 96/152
(58) Field of Classification Search ........... 95/107–110; 96/123, 134, 150, 139, 152
See application file for complete search history.

(56) References Cited

U.S. PATENT DOCUMENTS

| 1,422,007 | A | * | 7/1922 | Soddy | .......................... | 95/110 |
| 1,823,895 | A | | 9/1931 | Gray | | |
| 2,656,010 | A | * | 10/1953 | Thodos | .......................... | 95/111 |
| 2,780,310 | A | | 2/1957 | Schaub | | |
| 2,834,119 | A | | 5/1958 | Schaub | | |
| 2,859,257 | A | * | 11/1958 | Hess et al. | .............. | 208/310 R |
| 3,177,631 | A | * | 4/1965 | Tamura | ........................ | 95/109 |
| 3,211,361 | A | * | 10/1965 | Flinn | ............................ | 417/51 |
| 3,296,775 | A | | 1/1967 | Squires | | |
| 3,410,055 | A | | 11/1968 | Zenz | | |
| 3,708,981 | A | | 1/1973 | Johswich et al. | | |
| 3,716,969 | A | | 2/1973 | Maeda et al. | | |
| 3,795,090 | A | * | 3/1974 | Barnebey | ..................... | 96/150 |
| 3,881,899 | A | * | 5/1975 | Spulgis | ........................ | 96/131 |
| 3,912,466 | A | | 10/1975 | Zenz | | |

(Continued)

FOREIGN PATENT DOCUMENTS

DE 3830618 3/1990

(Continued)

*Primary Examiner*—Duane Smith
*Assistant Examiner*—Christopher P Jones
(74) *Attorney, Agent, or Firm*—Harness, Dickey & Pierce, P.L.C.

(57) ABSTRACT

A moving bed system for removing contaminates from a fluid stream is provided. The system can include a housing and a first bed system disposed in the housing. The first bed system can be coupled to the housing, and can include at least one flow channel adapted to enable an adsorbent material to flow through the first bed system. The system can include a second bed system disposed in the housing, which can include at least one flow channel in fluid communication with the first bed system to receive the adsorbent material from the first bed system. The channel of the second bed system can be symmetrical to the flow channel of the first bed system about a horizontal axis. The first bed system and the second bed system can direct a contaminated fluid stream into contact with the adsorbent material to remove the contaminates from the fluid stream.

13 Claims, 10 Drawing Sheets

U.S. PATENT DOCUMENTS

| | | | |
|---|---|---|---|
| 3,928,532 A | 12/1975 | Squires | |
| 4,017,278 A | 4/1977 | Reese | |
| 4,083,701 A | 4/1978 | Noack et al. | |
| 4,126,435 A | 11/1978 | Reese | |
| 4,149,858 A | 4/1979 | Noack et al. | |
| 4,354,862 A | 10/1982 | Sgaslik et al. | |
| 4,436,701 A | 3/1984 | Richter et al. | |
| 4,586,941 A | 5/1986 | Cooley | |
| 4,650,647 A | 3/1987 | Kito et al. | |
| 4,670,226 A | 6/1987 | Furuyama et al. | |
| 4,692,318 A * | 9/1987 | Tolpin et al. | 423/239.1 |
| 4,725,290 A | 2/1988 | Ohlmeyer et al. | |
| 4,744,804 A | 5/1988 | Furuyama et al. | |
| 4,869,734 A | 9/1989 | Jacquish | |
| 5,149,342 A | 9/1992 | Mestemaker et al. | |
| 5,308,590 A * | 5/1994 | Kersey et al. | 422/170 |
| 5,330,726 A * | 7/1994 | Bruggendick et al. | 422/177 |
| 5,356,462 A | 10/1994 | Bruggendick et al. | |
| 5,527,514 A | 6/1996 | Watanabe et al. | |
| 5,556,443 A | 9/1996 | Alexander | |
| 5,624,644 A | 4/1997 | McKenna et al. | |
| 5,628,819 A | 5/1997 | Mestemaker et al. | |
| 5,647,892 A * | 7/1997 | McKenna et al. | 95/110 |
| 5,932,179 A | 8/1999 | Watanabe et al. | |
| 6,562,113 B1 | 5/2003 | Aykanian et al. | |
| 6,783,572 B1 | 8/2004 | Squires | |
| 7,132,088 B2 * | 11/2006 | Smid et al. | 422/176 |
| 7,309,379 B2 | 12/2007 | Dai et al. | |
| 2004/0226450 A1 * | 11/2004 | Dai | 96/150 |

FOREIGN PATENT DOCUMENTS

| | | |
|---|---|---|
| EP | 0057468 | 8/1962 |
| EP | 0489241 | 6/1992 |
| GB | 2035128 | 6/1980 |
| GB | 2196550 | 5/1988 |
| WO | WO-9206770 | 4/1992 |

* cited by examiner

SYSTEM AND METHOD FOR A MOVING BED ADSORBER FOR CONTAMINANT REMOVAL

CROSS-REFERENCE TO RELATED APPLICATIONS

This application claims the benefit of U.S. Provisional Application No. 60/902,814, filed on Feb. 23, 2007. This application also claims the benefit of U.S. Provisional Application No. 60/994,921, filed on Sep. 24, 2007. The disclosures of the above applications are incorporated herein by reference.

FIELD

The present disclosure relates generally to removing contaminants from emissions, and more specifically, to systems and methods for a moving bed adsorber for contaminant removal from a fluid stream.

BACKGROUND

The statements in this section merely provide background information related to the present disclosure and may not constitute prior art.

Removing organic vapors from air emission points in industrial facilities has been practiced for many years as a way to recover and recycle valuable chemicals as well as reduce emissions of hazardous air pollutants. Many industries have large volumetric air emission points with low organic vapor concentrations that have proven a challenge to recover and recycle. Synthetic adsorbent media have been developed that are effective in removing organics in dilute concentrations from an air stream. This synthetic adsorbent material, however, is costly, and thus, systems need to be developed to use this adsorbent media in an effective way to capture and recover the organic material as well as regenerate the adsorbent media for reuse.

Typically, fixed bed adsorbers can be employed with the synthetic adsorbent media to capture and recover organic materials. Fixed bed adsorbers, however, can require a high flow rate in order to effectively capture and recover the organic materials. The high flow rate and the resultant pressure drop can require high energy blower systems, which utilize significant amounts of electrical energy. Fixed beds can also require extensive down time between cycles, as hot gas is generally used to remove the contaminant from the adsorbent, which then must be cooled prior to the next adsorb cycle. In order to eliminate the down time, two and sometimes three fixed beds are required depending on regeneration cycle time. In addition, due to their stationary nature, fixed bed adsorber systems typically cannot expose all of the synthetic adsorbent material during the adsorb cycle, which can result in short adsorb cycles and poor utilization of the synthetic adsorption material.

The synthetic adsorption material can also be used with a fluidized adsorber. Fluidized adsorbers can enable the adsorbent media to travel continually through the bed. Generally, in a fluidized adsorber, clean adsorbent media can enter at the top of the adsorber and can cascade through multiple perforated plates where it is fluidized by an emission stream that can enter from a bottom of the adsorber. The adsorbent media can flow through to the bottom of the adsorber, and can be transported to a regeneration system, which can regenerate the synthetic adsorption material and can recover the contaminant for reuse or destruction.

Fluidized adsorbers, however, can require a narrow range of flow rates to maximize adsorption efficiency. In this regard, if the flow rate is too low, then the adsorbent does not fluidize, and the adsorption efficiency is very low. If the flow rate is too high, then the resin can be carried over with the emissions air stream, which can cause loss of the adsorbent material. Generally, maximum adsorption efficiency can be obtained by relatively low fluidization velocities, which can require a large footprint for the fluidized adsorber.

A moving bed adsorber can also be used with a synthetic adsorbent material. Generally, in a moving bed adsorber, the adsorbent material can be passed through an inclined channel that can include louvers on an entrance to the channel. A resin retention screen can be positioned at an outlet of the channel. The moving bed adsorber has allowed for an increase in throughput (linear velocity) of the emissions air stream when compared to fluidized adsorbers, but the adsorbent material handling system employed by moving bed adsorbers can promote attrition of the adsorbent material, and can also require additional capital for the collection of the adsorbent material.

Accordingly, there is a continuing need for a system for removing organics form air emission streams that has excellent removal efficiency, can work over a wide range of volumetric flow rates, has low energy usage and lower capital cost.

SUMMARY

A moving bed system for removing contaminates from a fluid stream is provided. The system can include a housing and a first bed system disposed in the housing. The first bed system can be coupled to the housing, and can include at least one flow channel adapted to enable an adsorbent material to flow through the first bed system. The system can also include a second bed system disposed in the housing. The second bed system can include at least one flow channel in fluid communication with the first bed system. The at least one flow channel of the second bed system can be adapted to receive the adsorbent material from the first bed system. The at least one flow channel of the second bed system can be symmetrical to the at least one flow channel of the first bed system about a horizontal axis defined through the housing. The first bed system and the second bed system can be adapted to direct a contaminated fluid stream into contact with the adsorbent material to remove the contaminates from the contaminated fluid stream.

Further provided is a moving bed system for removing contaminates from a fluid stream. The system can include a pressurized housing. The pressurized housing can include an adsorbent material inlet and an adsorbent material outlet. The system can also include a supply of adsorbent material in communication with the adsorbent material inlet of the pressurized housing via at least supply one control valve. The supply of adsorbent material can be maintained at a pressure substantially equal to a pressure within the pressurized housing. The system can include a first bed system disposed in the housing. The first bed system can include at least one flow channel in fluid communication with the adsorbent material inlet of the pressurized housing to receive the adsorbent material to enable the adsorbent material to flow through the first bed system. The system can also include a second bed system disposed in the housing. The second bed system can include at least one flow channel in fluid communication with the first bed system to receive the adsorbent material from the first bed system to enable the adsorbent material to flow through the second bed system. The at least one flow channel of the second bed system can be in fluid communication with the adsorbent material outlet of the pressurized housing. The system can also include a discharge vessel in communication with the adsorbent material outlet of the pressurized housing via at least one discharge control valve to receive the adsorbent material after the adsorbent material has flowed through the second bed system. The discharge vessel can be maintained at a pressure substantially equal to the pressure within the pressurized housing. The system can further include a control system in communication with the supply control valve and the discharge control valve to enable the adsorbent material to cycle through the pressurized housing.

Also provided is a moving bed system for removing contaminates from a fluid stream. The system can include a housing having a top surface, a bottom surface and at least one wall. The top surface can include at least one fluid outlet and at least one adsorbent material inlet. The top surface can be coupled to the bottom surface via the at least one wall. The at least one wall can include at least one fluid inlet, and the bottom surface can include at least one adsorbent material outlet. The system can include a first bed system disposed in the housing and coupled to the at least one wall of the housing. The first bed system can include a screen, at least one flow channel and a plurality of louvers. The at least one flow channel can be in fluid communication with the adsorbent material inlet to receive an adsorbent material. The at least one flow channel can be adapted to enable the adsorbent material to flow through the first bed system. The plurality of louvers can be adapted to direct the fluid stream through the adsorbent material, and the screen can be adapted to prevent the adsorbent material from exiting the at least one flow channel. The first bed system can define a cavity through which the fluid stream flows. The plurality of louvers can be positioned adjacent to the cavity. The system can also include a second bed system disposed in the housing. The second bed system can include at least one flow channel in fluid communication with the first bed system. The at least one flow channel can be adapted to receive the adsorbent material from the first bed system. The at least one flow channel of the second bed system can be symmetrical to the at least one flow channel of the first bed system about a horizontal axis defined through the housing. The at least one flow channel of the second housing can be in fluid communication with the at least one adsorbent material outlet. The second bed system can also be in fluid communication with the at least one fluid inlet. The fluid stream can be directed through the second bed system and the first bed system such that the fluid stream passes through the adsorbent material twice prior to exiting the at least one fluid outlet.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
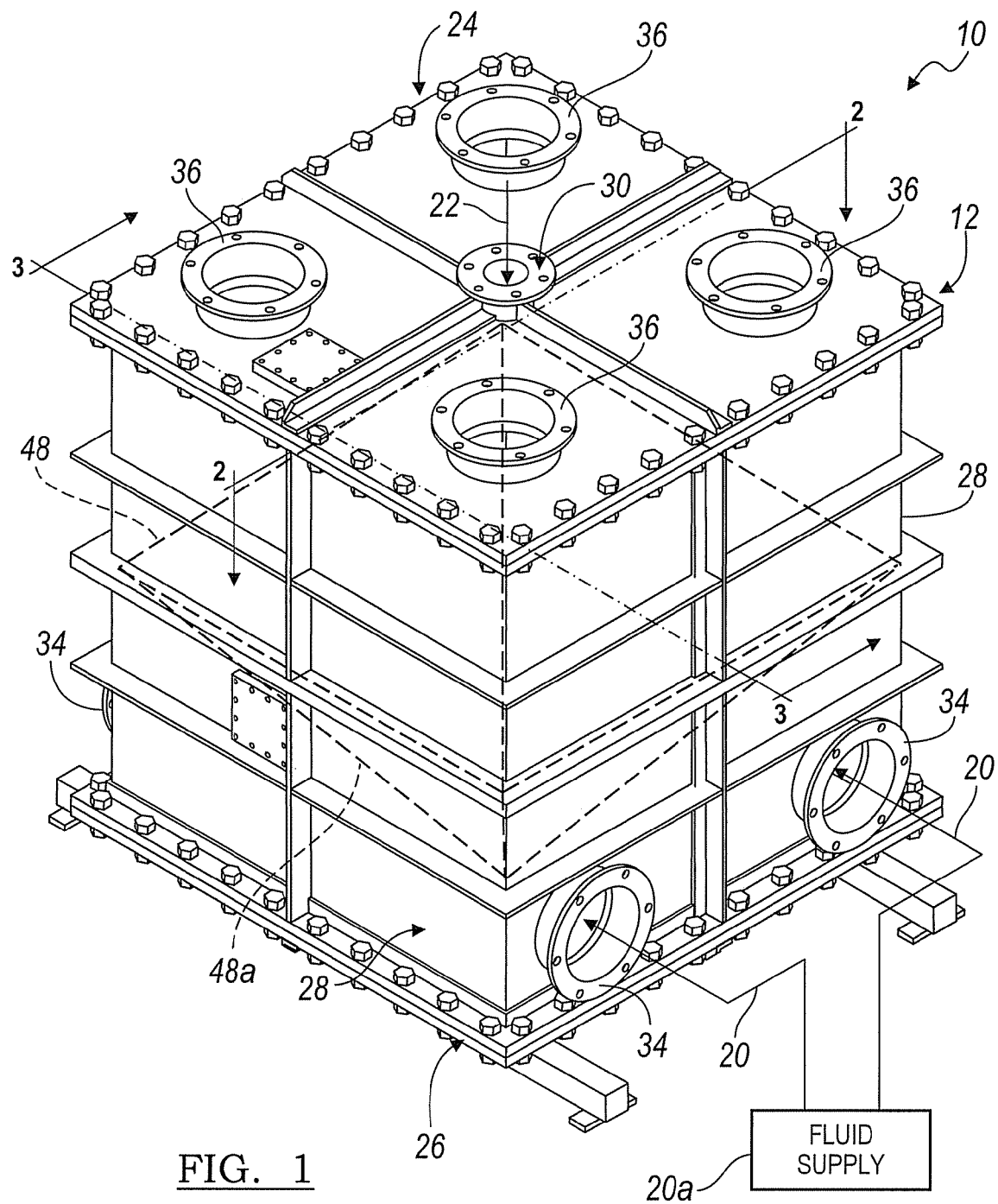
FIG. 1 is a perspective schematic view of a moving bed adsorber for removing contaminates from a fluid stream according to various embodiments of the present disclosure.

The following description is merely exemplary in nature and is not intended to limit the present disclosure, application, or uses. It should be understood that throughout the drawings, corresponding reference numerals indicate like or corresponding parts and features. As indicated above, the present teachings are directed towards providing a system and method for a moving bed adsorber for emissions contaminant removal. It should be noted, however, that the present teachings could be applicable to any appropriate procedure in which it is desirable to remove contaminants from a fluid stream. Therefore, it will be understood that the following discussions are not intended to limit the scope of the appended claims.

Figure 2:
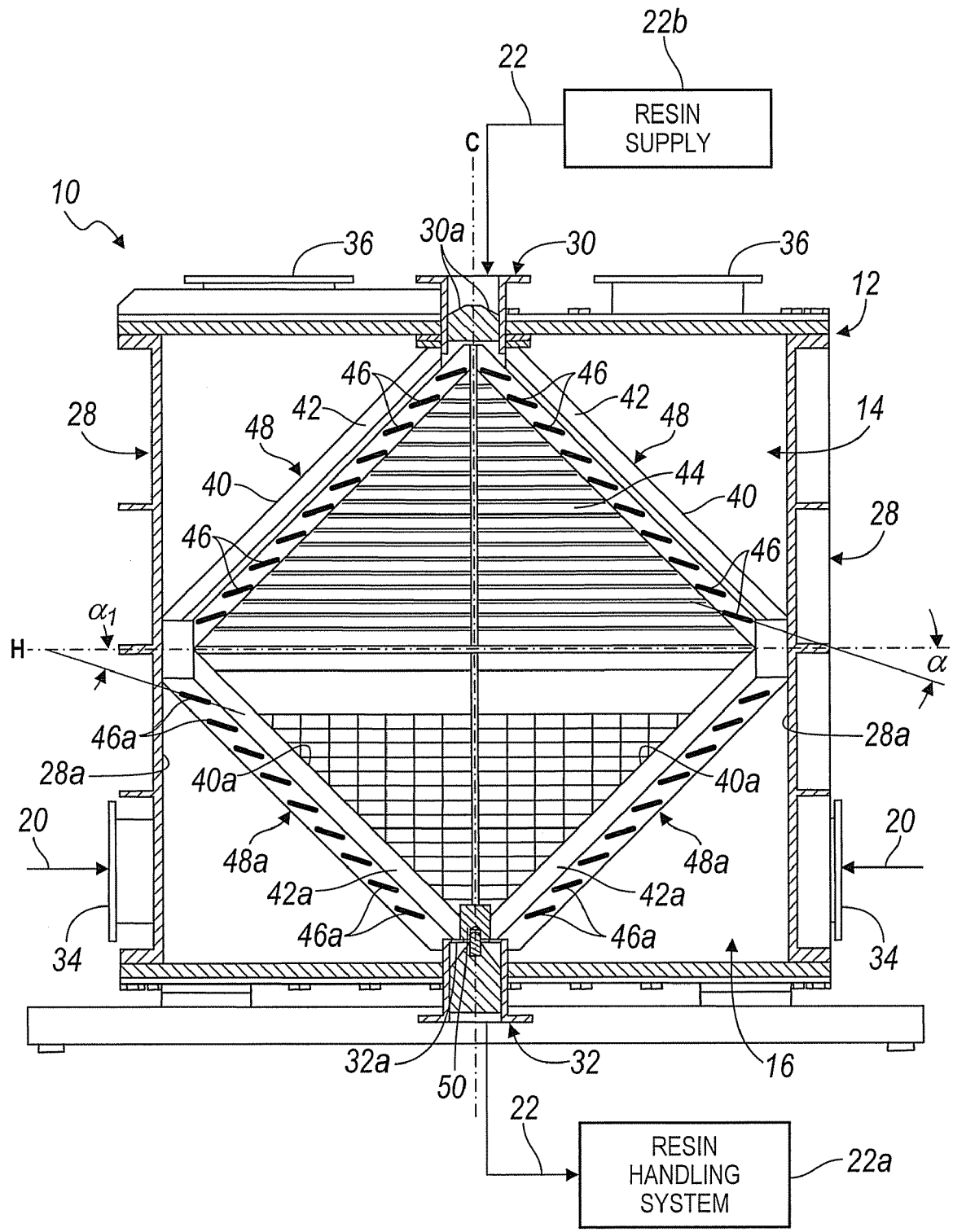
FIG. 2 is a cross-sectional schematic view of the moving bed adsorber of FIG. 1, taken along line 2-2 of FIG. 1.

With reference to FIGS. 1-2, a moving bed adsorber 10 is shown. The moving bed adsorber 10 can include a housing 12 that encloses a first bed system 14 and a second bed system 16. The moving bed adsorber 10 can receive at least one contaminated fluid stream 20, and the first bed system 14 and second bed system 16 can be used to remove the contaminates from the fluid stream 20. Each of the first bed system 14 and the second bed system 16 can provide large flow channel sections, which can receive generally equal amounts of an adsorbent material or resin 22. In this regard, the housing 12, first bed system 14 and second bed system 16 can be shaped such that the resin 22 can flow through the moving bed adsorber 10 at a rate about equal to a plug flow rate of the resin 22 while maintaining suitable pressure of the fluid stream 20. Thus, the first bed system 14 and the second bed system 16 can provide efficient handling of the resin 22, with increased contaminant extraction capabilities.

With continued reference to FIGS. 1-2, the housing 12 can include a top section 24, a bottom section 26, walls 28, at least one resin inlet 30, at least one resin outlet 32 (FIG. 2), at least one fluid inlet 34 and at least one fluid outlet 36. The housing 12 can generally be sized and shaped to coordinate with the shape of the first bed system 14 and the second bed system 16. Typically, the housing 12 can be made out of a metal or metal alloy, and can be composed of multiple pieces as necessary to facilitate the enclosure of the first bed system 14 and the second bed system 16. The top section 24 can be generally planar and opposite the bottom section 26. The walls 28 can couple the top section 24 to the bottom section 26. The first bed system 14 and the second bed system 16 can be positioned within the walls 28 of the housing 12, and each of the first bed system 14 and the second bed system 16 can be coupled to and in contact with an inner surface 28a of each wall 28 (FIG. 2).

The resin inlet 30 can typically comprise a single resin inlet 30, which can be disposed about a centerline C of the moving bed adsorber 10 (FIG. 2). The resin inlet 30 can be coupled to the top section 24 of the housing 12. The resin inlet 30 can be generally annular, and can include one or more flow dividers 30a to distribute the resin 22 amongst flow channels associated with the first bed system 14, as will be discussed herein (FIG. 2). In this regard, the resin 22 can comprise any suitable adsorbent material for the particular contaminate in the fluid stream 20, and can comprise any desired shape, such as spherical or granular. Generally, the flow dividers 30a can have a downward slope to assist gravity in the flowing of the resin 22.

The resin outlet 32 can be coupled to the bottom section 26 of the housing 12. The resin outlet 32 can generally comprise one outlet, which can be annular in shape, and can be disposed about the centerline C of the housing 12 (FIG. 2). The resin outlet 32 can include one or more flow dividers 32a, if desired, to facilitate the flow of the resin 22 through the resin outlet 32 (FIG. 2).

With reference to FIGS. 1-2, the at least one fluid inlet 34 can typically comprise four fluid inlets 34 such that there is one fluid inlet 34 per flow channel of the moving bed adsorber 10. The fluid inlets 34 can be annular, and can be coupled to the walls 28, and can be generally coupled to the walls 28 such that the fluid inlets 34 are adjacent to the bottom section 26 of the housing 12. The fluid inlets 34 can receive the contaminated fluid stream 20 from a suitable fluid supply 20a (FIG. 1). As the fluid supply 20a can comprise any suitable fluid supply known in the art, such as an exhaust fluid supply, a pressurized fluid supply, etc., the fluid supply 20a will not be discussed in great detail herein. Briefly, however, the fluid supply 20a can be configured to provide the contaminated fluid stream 20 at such a velocity that the fluid stream 20 can flow through the second bed system 16 and the first bed system 14 and exit through the at least one fluid outlet 36.

The at least one fluid outlet 36 can typically comprise four fluid outlets 36 such that there is one fluid outlet 36 per flow channel of the moving bed adsorber 10 (FIG. 1). The fluid outlets 36 can be annular, and can be coupled to the top section 24 of the housing 12. The fluid outlets 36 can receive the fluid stream 20 after the fluid stream 20 has passed through the second bed system 16 and the first bed system 14. Depending upon the type of contaminants in the fluid stream 20, the fluid outlets 36 can be coupled to additional fluid conduits, which can direct the cleaned fluid stream 20 to a desired vessel for additional processing or reuse, or could be open to the atmosphere.

With reference to FIG. 2, the first bed system 14 can include a screen 40, one or more flow channels 42, a cavity 44 and a plurality of louvers 46. The screen 40 can be disposed over the flow channels 42 such that the screen 40 can prevent any entrained resin 22 from entering the fluid stream 20 as the fluid stream 20 flows upwardly through the flow channels 42. This can ensure that the resin 22 remains within the flow channels 42. The screen 40 can generally be coupled about the resin inlet 30.

Figure 3:
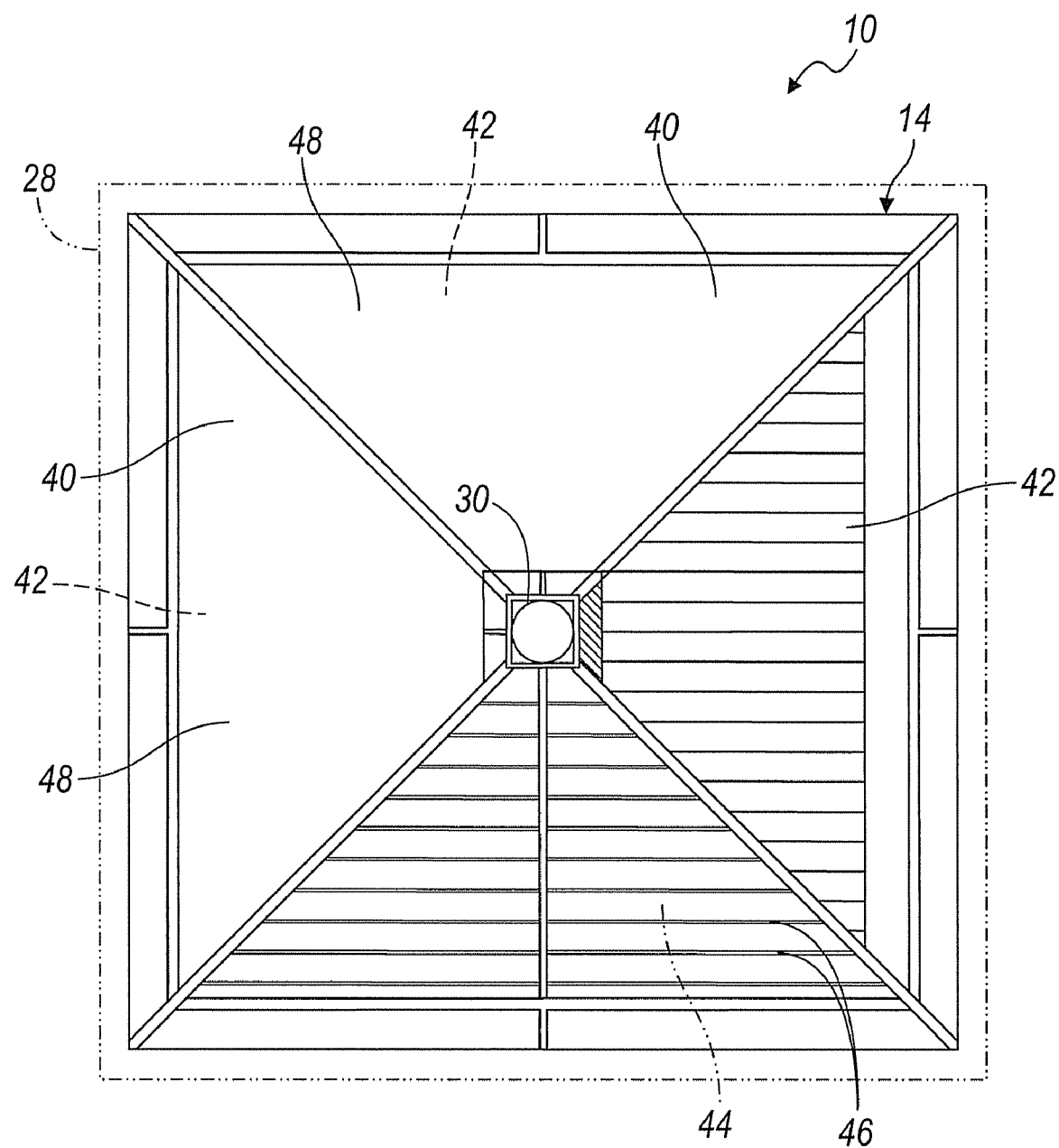
FIG. 3 is a cross-sectional schematic view of the moving bed adsorber of FIG. 1, taken along line 3-3 of FIG. 1.

In one example, with reference to FIG. 3, the first bed system 14 can be generally pyramidal in shape, such that the first bed system 14 defines four flow channels 42. In this regard, each face 48 of the first bed system 14 can define one flow channel 42. With reference to FIG. 2, the first bed system 14 can be coupled to the housing 12 and retained within the walls 28 of the housing 12. The first bed system 14 can be positioned within the housing 12 such that the flow channels 42 can extend downwardly from the resin inlet 30 to the inner surface 28a of each of the walls 28. The flow channels 42 can be in communication with the resin inlet 30 to receive the resin 22. Generally, the downward slope of the flow channels 42 can enable the resin 22 to flow through the first bed system 14 at a flow rate that is about equal to the plug flow rate for the particular resin 22. Thus, the resin 22 can flow through the first bed system 14 at a rate that enables the resin 22 to move as a unitary mass of resin 22, without substantial mixing of the particles of the resin 22. The flow channels 42 of the first bed system 14 can correspond with the number of fluid outlets 36, such that each face 48 of the pyramid of the first bed system 14 can be associated with one fluid outlet 36.

The cavity 44 can be defined by the flow channels 42. As the cavity 44 can be bounded by the flow channels 42, any portion of the fluid stream 22 entering the cavity 44 can be directed through the flow channels 42 a second time. Thus, the moving bed adsorber 10 can comprise a two-pass adsorption system. This can enable the further removal or refinement of the fluid stream 20.

With reference to FIG. 2, the louvers 46 can be positioned adjacent to the flow channel 42, on a side of the flow channel 42 that is generally opposite the screen 40. The louvers 46 can facilitate the flow of the fluid stream 20 through the flow channel 42. In this regard, the louvers 46 can be configured to direct the fluid stream 20 through the flow channels 42 at an angle between about 75 degrees to about 105 degrees relative to the flow of the resin 22 in the flow channels 42. For example, the louvers 46a can be angled relative to a horizontal axis H at an angle $\alpha$ between about 20 degrees to about 40 degrees relative to the horizontal axis H.

With reference to FIG. 2, as the second bed system 16 can be substantially similar to the first bed system 14, only the differences between the first bed system 14 and the second bed system 16 will be discussed in herein, and the same reference numerals will be used to denote the same or similar features of the second bed system 16. Briefly, the second bed system 16 can include a screen 40a, one or more flow channels 42a, a cavity 44a and a plurality of louvers 46a. The screen 40a can be disposed over or on top of the flow channels 42a such that the screen 40a can retain any entrained resin 22 from the fluid stream 20 as the fluid stream 20 flows upwardly through the flow channels 42a. The screen 40 can generally be coupled to a peg 50 extending from the resin outlet 32, which can secure the screen 40a in a position over the flow channels 42a.

In one example, the second bed system 16 can comprise an inverse pyramidal shape, such that the second bed system 16 defines four downwardly sloping flow channels 42a. In this regard, each face 48a of the second bed system 16 can define one flow channel 42a, which can be in communication with a respective face 48 of the first bed system 14 to receive the resin 22. The second bed system 16 can be coupled to the walls 28 of the housing 12 such that the flow channels 42a extend downwardly from the inner surface 28a of the walls 28 to the resin outlet 32. The flow channels 42a can be in communication with the resin outlet 32 to output the resin 22 into a suitable resin handling system 22a, which can then direct the resin 22 for disposal or desorption processing, for example. The slope of the flow channels 42a can enable the resin 22 to flow from the first bed system 14 through the second bed system 16 to the resin outlet 32 at a flow rate that is about equal to the plug flow rate for the particular resin 22. Thus, the resin 22 can also flow through the second bed system 16 at a rate that enables the resin 22 to move as a unitary mass of resin 22, without substantial mixing of the particles of the resin 22.

The flow channels 42a of the second bed system 16 can correspond with the number of fluid inlets 34, such that each face 48a of the inverse pyramid of the second bed system 16 can be associated with one fluid inlet 34. The fluid inlets 34 can direct a fluid stream 20 at each face 48a of the inverse pyramid of the second bed system 16.

The cavity 44a can be defined and bounded by the screen 40a. Thus, any portion of the fluid stream 20 exiting the flow channels 42a and flowing through the screen 40a into the cavity 44a can be directed through the flow channels 42, 42a a second time. This can enable the further removal or refinement of the fluid stream 20.

The louvers 46a can be positioned adjacent to the flow channel 42a, on a side of the flow channel 42a that is generally opposite the screen 40a. The louvers 46a can facilitate the flow of the fluid stream 20 through the flow channel 42a. In this regard, the louvers 46a can be configured to direct the fluid stream 20 from the fluid inlets 34 into the flow channels 42a at an angle between about 75 degrees to about 105 degrees relative to the flow of the resin 22 in the flow channels 42a. For example, the louvers 46a can angled relative to the horizontal axis H at an angle $\alpha_1$ between about 20 degrees to about 40 degrees relative to and below the horizontal axis H.

In use, the resin 22 can flow from a resin supply 22b into the resin inlet 30. The flow dividers 30a in the resin inlet 30 can separate the resin 22 such that the resin 22 is distributed substantially evenly amongst the four flow channels 42a of the first bed system 14. The resin 22 can flow through the flow channels 42a, propelled by the slope of the flow channels 42a and gravity at a flow rate about equal to the plug flow rate for the resin 22. After flowing through the flow channels 42 of the first bed system 14, the resin 22 can flow through the flow channels 42a of the second bed system 16.

The downward slope of the flow channels 42a and gravity can enable the resin 22 to flow through the flow channels 42a at a flow rate about equal to the plug flow rate for the resin 22. The resin 22 can exit the second bed system 16 through the resin outlet 32. The resin 22 can flow from the resin outlet 32 into the resin handling system 22a. Thus, the moving bed adsorber 10 can enable good distribution of the resin 22, and by modifying the slope of the flow channels 42, the flow rate of the resin 22 can be easily controlled. Further, the use of only one resin inlet 30 and resin outlet 32 can enable easy handling of the resin 22, both in and out of the moving bed adsorber 10. The configuration of the moving bed adsorber 10 can also allow for less attrition of the resin 22.

Substantially simultaneously to the flowing of the resin 22 through the moving bed adsorber 10, the fluid stream 20 can flow from the fluid supply 20a into the fluid inlets 34. From the fluid inlets 34, the fluid stream 20 can be directed by the louvers 46a into the flow channels 42a of the second bed system 16. The fluid stream 20 can then pass through the screen 40a, and can flow into the cavity 44a. The fluid stream 20 can flow from the cavity 44a into the cavity 44, and/or can be directed by the louvers 46 into the flow channels 42 of the first bed system 14. Thus, the fluid stream 20 passes through the resin 22 twice, which further refines and removes contaminates from the fluid stream 20, resulting in a greater capture efficiency for the moving bed adsorber 10. In addition, the configuration of the moving bed adsorber 10 can enable the fluid stream 20 to exit the moving bed adsorber 10 at an acceptable pressure even though the fluid stream 20 passes through the resin 22 twice.

In addition, it should be noted that although the housing 12 is described herein as being rectangular to accommodate the first bed system 14 and second bed system 16, which are described herein as being pyramidal in shape, the housing 12, first bed system 14 and second bed system 16 can have any desired shape to facilitate the adsorption of organic compounds. Thus, the housing 12, first bed system 14 and second bed system 16 can have any number of faces 48, which can form any number of flow channels 42. In addition, although the first bed system 14 and the second bed system 16 are described herein as being symmetrical about the horizontal axis H and the centerline C, the first bed system 14 and the second bed system 16 can be symmetric about only one of the horizontal axis H and centerline C, or could be asymmetrical depending upon the desired flow rate for the resin 22.

With reference to FIGS. 4-7, in one of various embodiments, a moving bed adsorber 10b includes a housing 12b, a first bed system 14b and a second bed system 16b. The moving bed adsorber 10b can be operable to provide high flow rates of the fluid stream 20 through the resin 22, which can also result in a higher flow rate for the resin 22. As the moving bed adsorber 10b can be substantially similar to the moving bed adsorber 10, only the differences between the moving bed adsorber 10 and the moving bed adsorber 10b will be discussed in great herein. With continued reference to FIGS. 4-5, the housing 12b can include a top section 24b (FIG. 4), a bottom section 26b (FIG. 5), walls 28b, a baffle or divider 100 (FIG. 4), the resin inlet 30 (FIG. 4), the resin outlet 32 (FIG. 5), at least one first fluid inlet 102 (FIG. 4), at least one second fluid inlet 104 (FIG. 5), at least one first fluid outlet 106 and at least one second fluid outlet 108.

The housing 12b can generally be sized and shaped to coordinate with the shape of the first bed system 14b and the second bed system 16b. The first bed system 14b and the second bed system 16b can be positioned within the walls 28b of the housing 12b, and can be divided by the divider 100. In this regard, the divider 100 can extend along the horizontal axis H, and can serve to divide the first bed system 14b and the second bed system 16b into individual systems. In this regard, with reference to FIG. 6, the divider 100 can serve to prevent the flow of the contaminated fluid stream 20 between the first bed system 14b and the second fluid system 16b. The divider 100, however, can include an aperture 100a, which can enable the resin 22 to flow from the first bed system 14b to the second bed system 16b.

Figure 4:
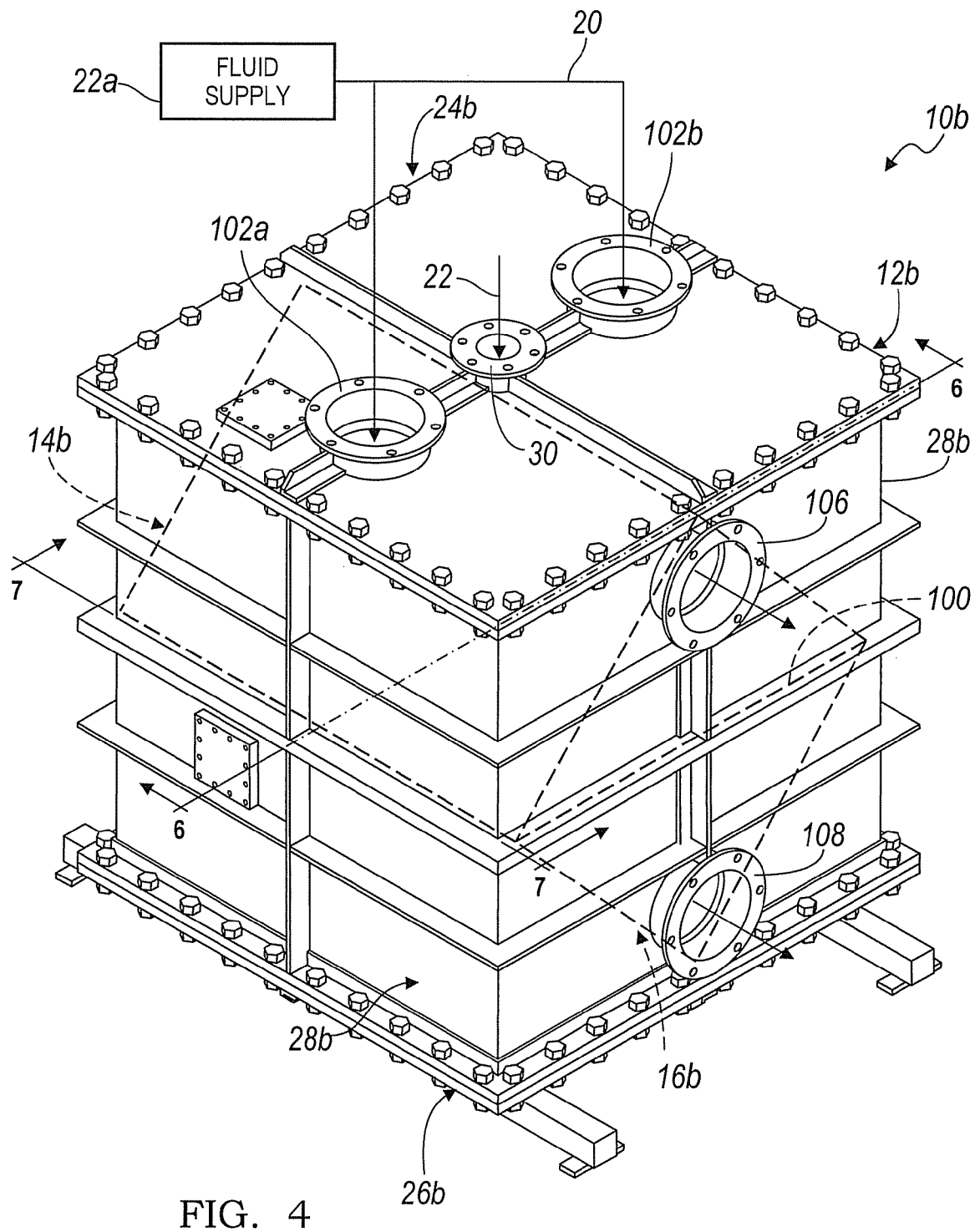
FIG. 4 is a perspective schematic illustration of a moving bed adsorber for removing contaminates from a fluid stream according to one of various embodiments of the present disclosure.
Figure 5:
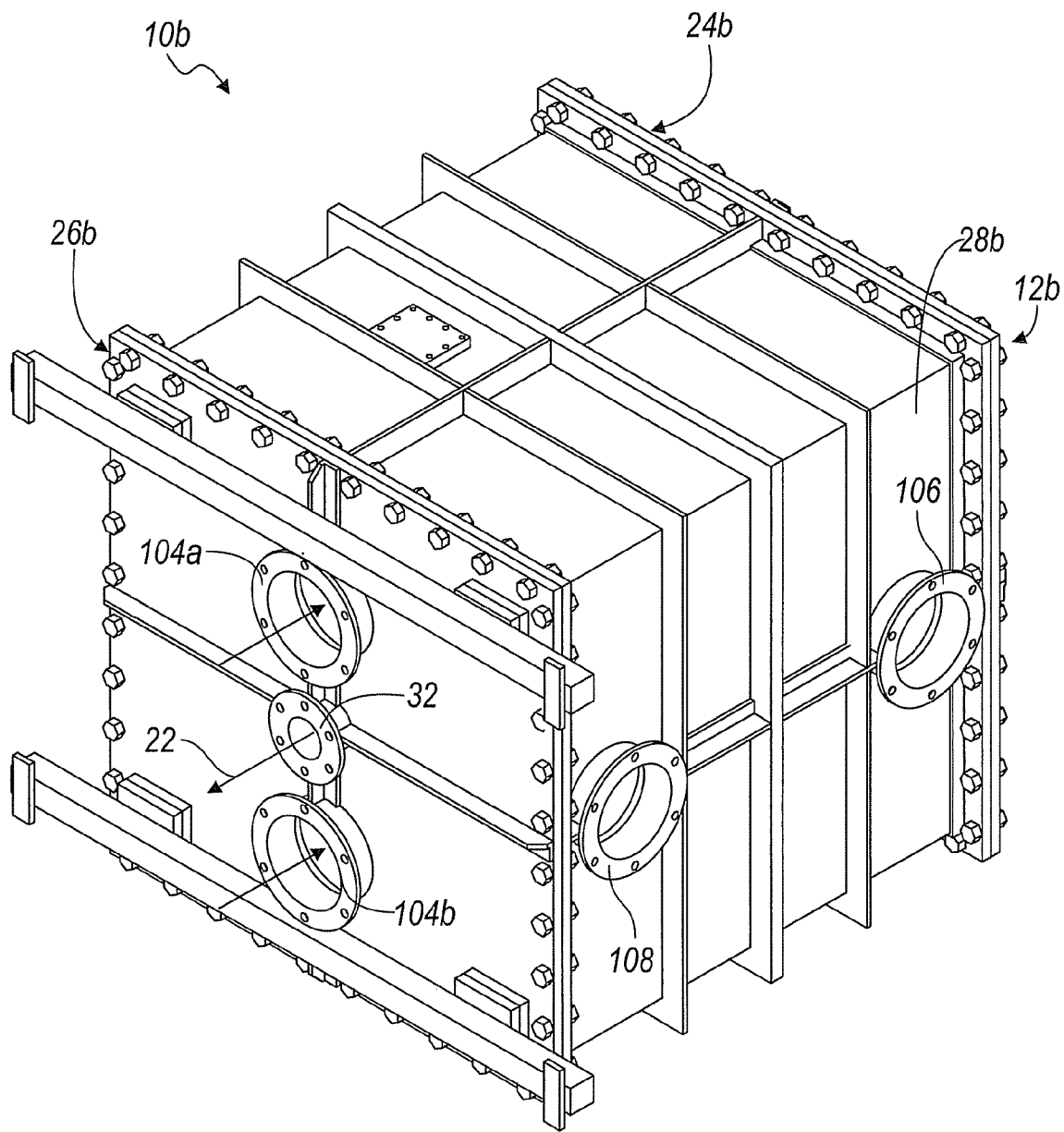
FIG. 5 is a perspective rear view of the moving bed adsorber of FIG. 4.
Figure 6:
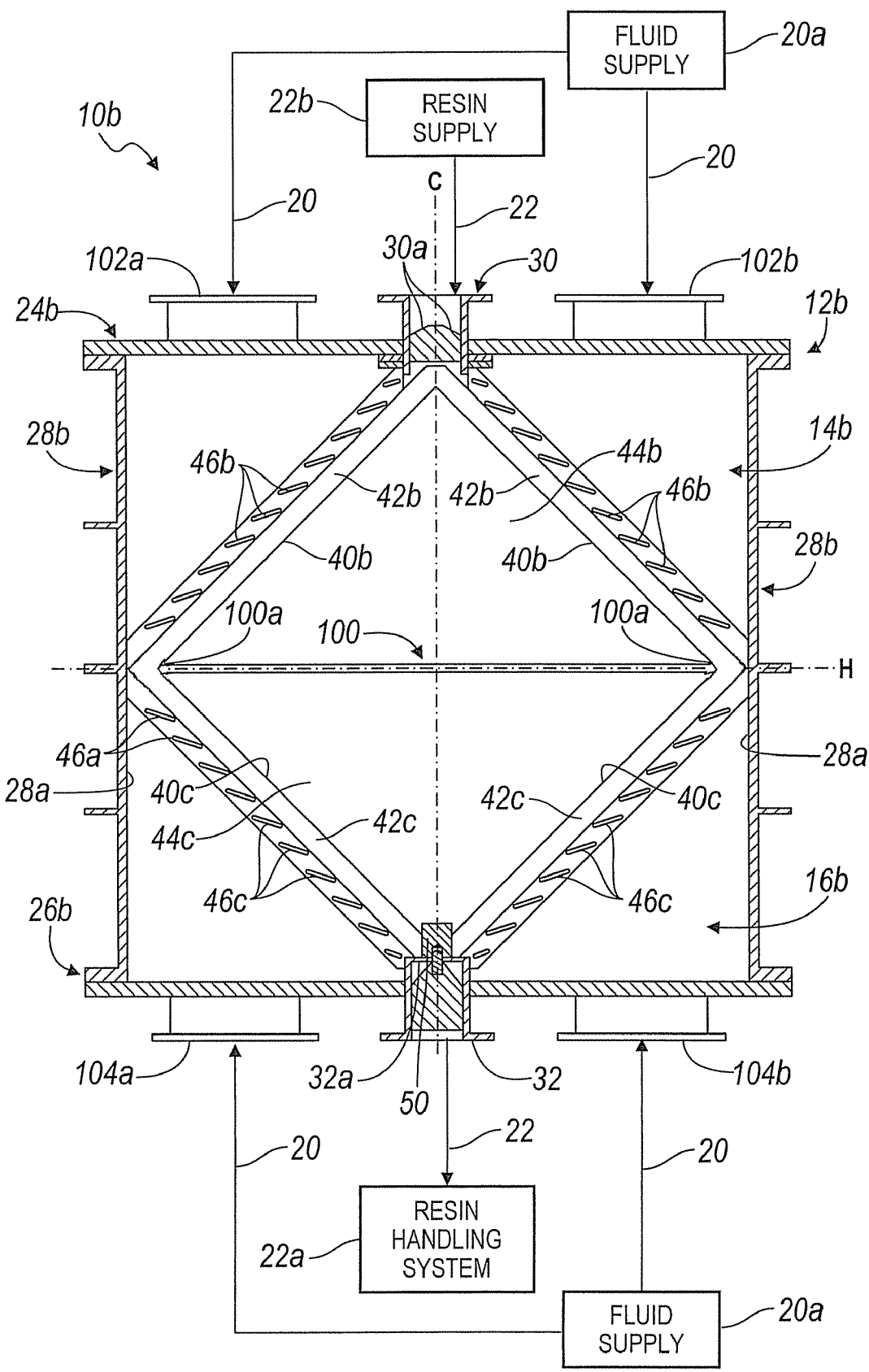
FIG. 6 is a cross-sectional schematic view of the moving bed adsorber of FIG. 4, taken along line 6-6 of FIG. 4.

With reference to FIGS. 4 and 6, the at least one first fluid inlet 102 can typically comprise two first fluid inlets 102a, 102b, with one first fluid inlet 102 per flow channel of the first bed system 14b. The first fluid inlets 102 can be annular, and can be coupled to the top surface 24b. The first fluid inlets 102 can receive the contaminated fluid stream 20 from the fluid supply 20a. With reference to FIGS. 5 and 6, the at least one second fluid inlet 104 can typically comprise two second fluid inlets 104a, 104b, with one second fluid inlet 104 per flow channel of the second bed system 16b. The second fluid inlets 104 can be annular, and can be coupled to the bottom surface 26b. The second fluid inlets 104 can receive the contaminated fluid stream 20 from the fluid supply 20a.

Figure 7:
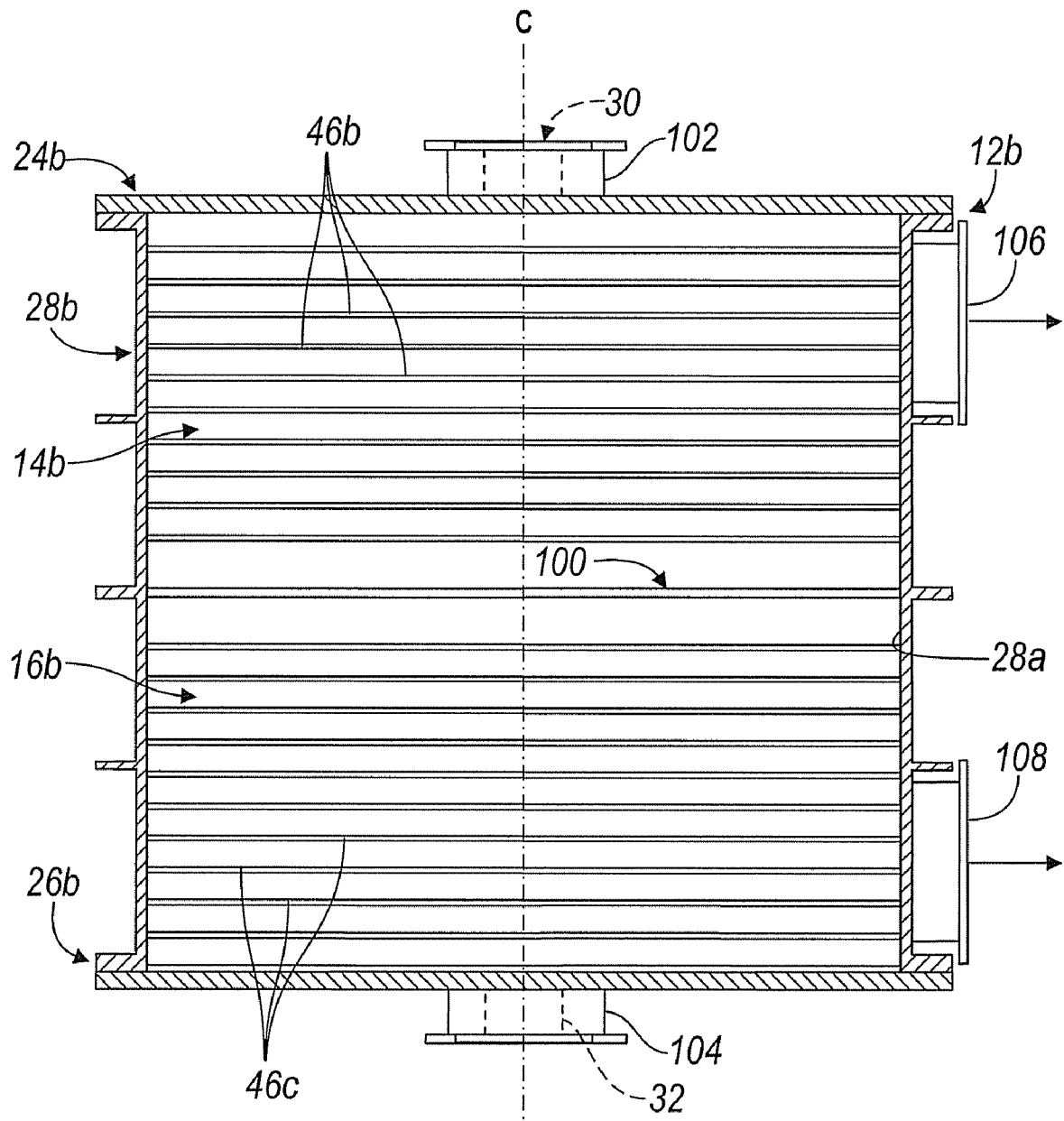
FIG. 7 is a cross-sectional schematic view of the moving bed adsorber of FIG. 4, taken along line 7-7 of FIG. 4.

With reference to FIGS. 4, 5 and 7, the at least one first fluid outlet 106 can typically comprise a single fluid outlet, which can be coupled to one of the walls 28b of the moving bed adsorber 10b. The first fluid outlet 106 can be annular, and can receive the fluid stream 20 after the fluid stream 20 has passed through the first bed system 14b, as best shown in FIG. 7. Depending upon the type of contaminants in the fluid stream 20, the first fluid outlet 106 can be coupled to additional fluid conduits, which can direct the cleaned fluid stream 20 to a desired vessel for additional processing or reuse, or could be open to the atmosphere.

With reference to FIGS. 4, 5 and 7, the at least one second fluid outlet 108 can typically comprise a single fluid outlet, which can be coupled to one of the walls 28b of the moving bed adsorber 10b. The second fluid outlet 108 can be annular, and can receive the fluid stream 20 after the fluid stream 20 has passed through the second bed system 16b, as best shown in FIG. 7. Depending upon the type of contaminants in the fluid stream 20, the second fluid outlet 108 can be coupled to additional fluid conduits, which can direct the cleaned fluid stream 20 to a desired vessel for additional processing or reuse, or could be open to the atmosphere.

With reference to FIGS. 6 and 7, the first bed system 14b can include a screen 40b, one or more flow channels 42b, a cavity 44b and a plurality of louvers 46b. In this example, the first bed system 14b can be generally inverse V-shaped, and can define two flow channels 42b. The first bed system 14b can be coupled to the housing 12b. The first bed system 14b can be retained within the walls 28b of the housing 12b and can receive the resin 22 from the resin inlet 30. The screen 40b can be disposed below the flow channels 42b such that the screen 40b can remove any entrained resin 22 from the fluid stream 20 as the fluid stream 20 flows downwardly through the flow channels 42b towards the first fluid outlet 106.

The flow channels 42b can extend downwardly from the resin inlet 30 to the divider 100. Generally, the downward slope can enable the resin 22 to flow through the first bed system 14b at a flow rate that is about equal to the plug flow rate for the particular resin 22. Each of the flow channels 42b can be in communication with a respective one of the first fluid inlets 102 to receive the fluid stream 20.

The cavity 44b can be defined by and bounded by the screen 40b. Thus, any portion of the fluid stream 20 entering the cavity 44b can be substantially free from entrained resin. The fluid stream 20 can flow from the cavity 44b to the first fluid outlet 106.

The louvers 46b can be positioned adjacent to the flow channel 42b, on a side of the flow channel 42b that is generally opposite the screen 40b. The louvers 46b can facilitate the flow of the fluid stream 20 through the flow channel 42b. In this regard, the louvers 46b can be configured to direct the fluid stream 20 through the flow channels 42b at an angle between about 75 degrees to about 105 degrees relative to the flow of the resin 22 in the flow channels 42b.

As the second bed system 16b can be substantially similar to the first bed system 14b, only the differences between the first bed system 14b and the second bed system 16b will be discussed in herein, and the same reference numerals will be used to denote the same or similar features of the second bed system 16b. Briefly, the second bed system 16b can include a screen 40c, one or more flow channels 42c, a cavity 44c and a plurality of louvers 46c. The screen 40c can be disposed over or on top of the flow channels 42c such that the screen 40c can remove any entrained resin 22 from the fluid stream 20 as the fluid stream 20 flows upward through the flow channels 42c.

In one example, the second bed system 16b can comprise a V-shape, such that the second bed system 16b defines two downwardly sloping flow channels 42c. Each flow channel 42c can be in communication with the flow channels 42b of the first bed system 14b, via the divider 100, to receive the resin 22. The flow channels 42c can extend downwardly from the divider 100 to the resin outlet 32 to output the resin 22 into the resin handling system 22a, which can then direct the resin 22 for disposal or desorption processing, for example. The slope of the flow channels 42c can enable the resin 22 to flow from the first bed system 14b through the second bed system 16b to the resin outlet 32 at a flow rate that is about equal to the plug flow rate for the particular resin 22. Each of the flow channels 42c of the second bed system 16b can be in communication with a respective one of the second fluid inlets 104 to receive the fluid stream 20.

The cavity 44c can be defined by and bounded by the screen 40c. Thus, any portion of the fluid stream 20 entering the cavity 44c can be substantially free from entrained resin. The fluid stream 20 can flow from the cavity 44c to the second fluid outlet 108.

The louvers 46c can be positioned adjacent to the flow channel 42c, on a side of the flow channel 42c that is generally opposite the screen 40c. The louvers 46c can facilitate the flow of the fluid stream 20 through the flow channel 42c. In this regard, the louvers 46c can be configured to direct the fluid stream 20 through the flow channels 42c at an angle between about 75 degrees to about 105 degrees relative to the flow of the resin 22 in the flow channels 42c.

In use, the resin 22 can flow from the resin supply 22b into the resin inlet 30. The resin 22 can flow through the flow channels 42b, propelled by the slope of the flow channels 42b and gravity at a flow rate about equal to the plug flow rate for the resin 22. After flowing through the flow channels 42b of the first bed system 14b, the resin 22 can flow through the flow channels 42c of the second bed system 16b.

The downward slope of the flow channels 42c and gravity can enable the resin 22 to flow through the flow channels 42c at a flow rate about equal to the plug flow rate for the resin 22. The resin 22 can exit the second bed system 16b through the resin outlet 32. The resin 22 can flow from the resin outlet 32 into the resin handling system 22a.

Substantially simultaneously to the flowing of the resin 22 through the moving bed adsorber 10b, the fluid stream 20 can flow from the fluid supply 20a into the first fluid inlets 102 and the second fluid inlets 104. From the first fluid inlets 102, the fluid stream 20 can be directed by the louvers 46b into the flow channels 42b of the first bed system 14b. The fluid stream 20 can then pass through the screen 40b, and can flow into the cavity 44b. The fluid stream 20 can flow from the cavity 44b to the first fluid outlet 106.

From the second fluid inlets 104, the fluid stream 20 can be directed by the louvers 46c into the flow channels 42c of the second bed system 16c. The fluid stream 20 can then pass through the screen 40c, and can flow into the cavity 44c. The fluid stream 20 can flow from the cavity 44c through the second fluid outlet 108. Thus, the moving bed adsorber 10b can provide an increased flow rate for the fluid stream 20, without requiring a large moving bed system.

Figure 8:
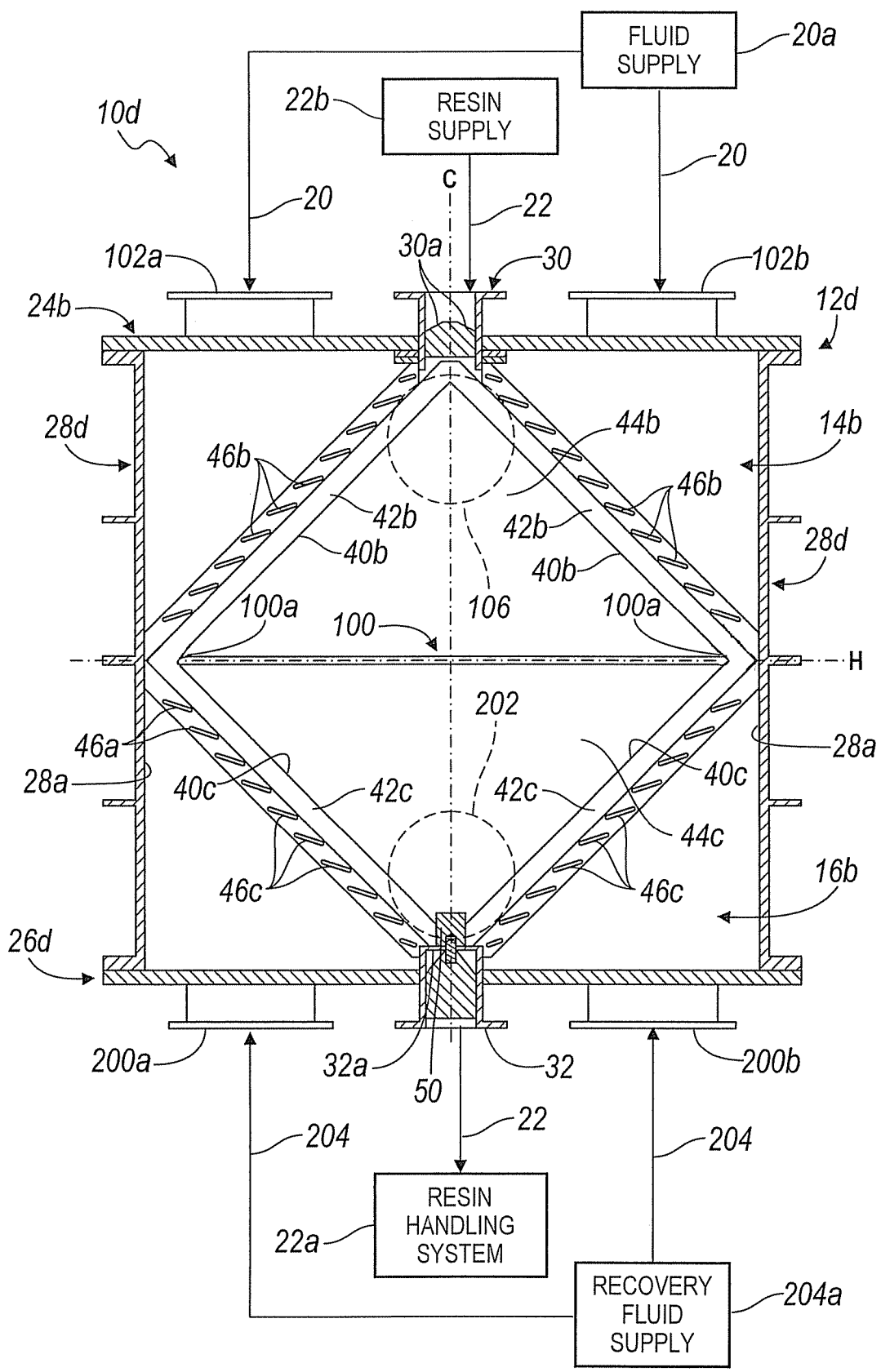
FIG. 8 is a cross-sectional schematic view of the moving bed adsorber of FIG. 4, taken along line 6-6 of FIG. 4, illustrating one of various embodiments of the moving bed adsorber.
Figure 9:
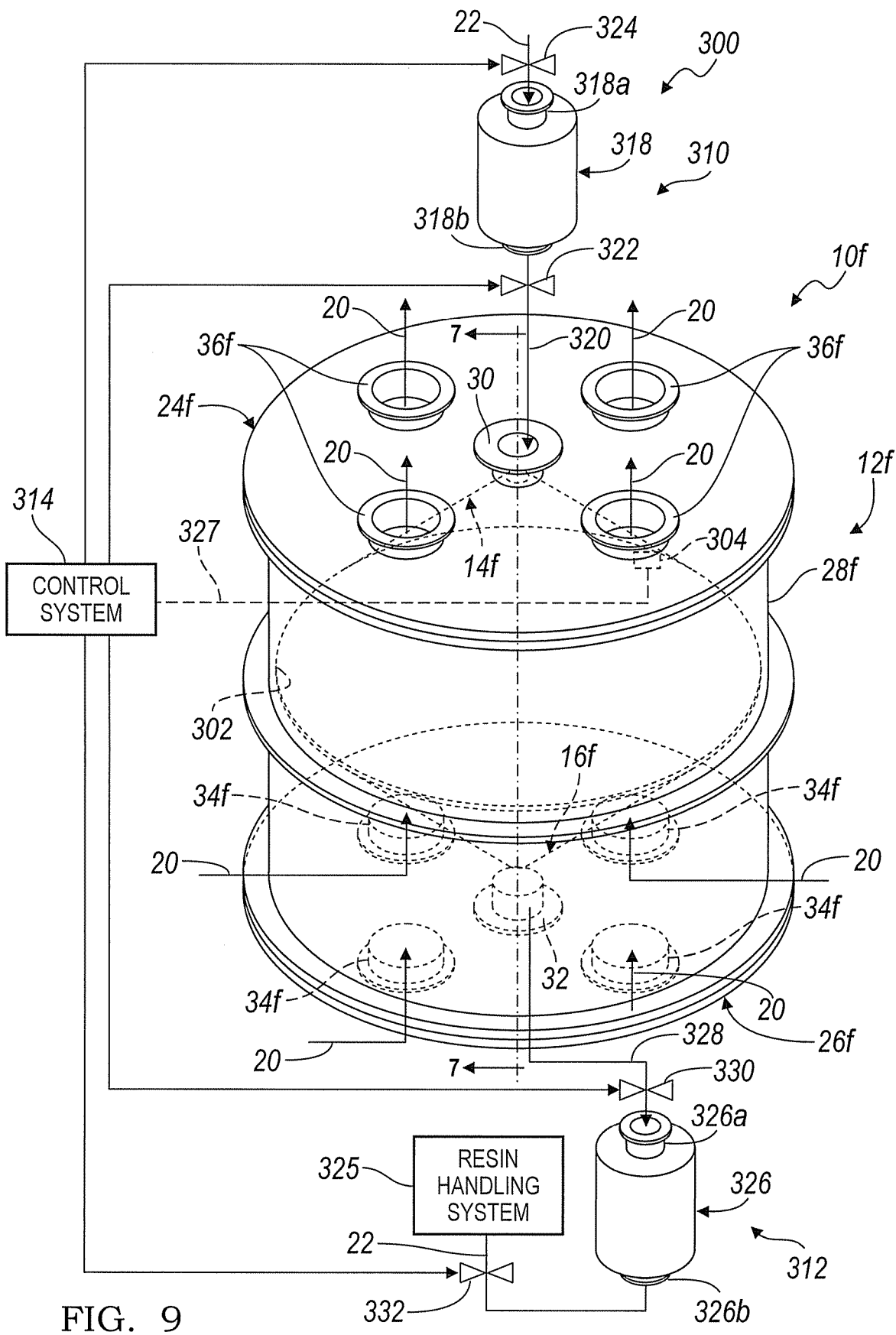
FIG. 9 is a schematic illustration of a moving bed adsorber for removing contaminates from a fluid stream according to one of various embodiments of the present disclosure.
Figure 10:
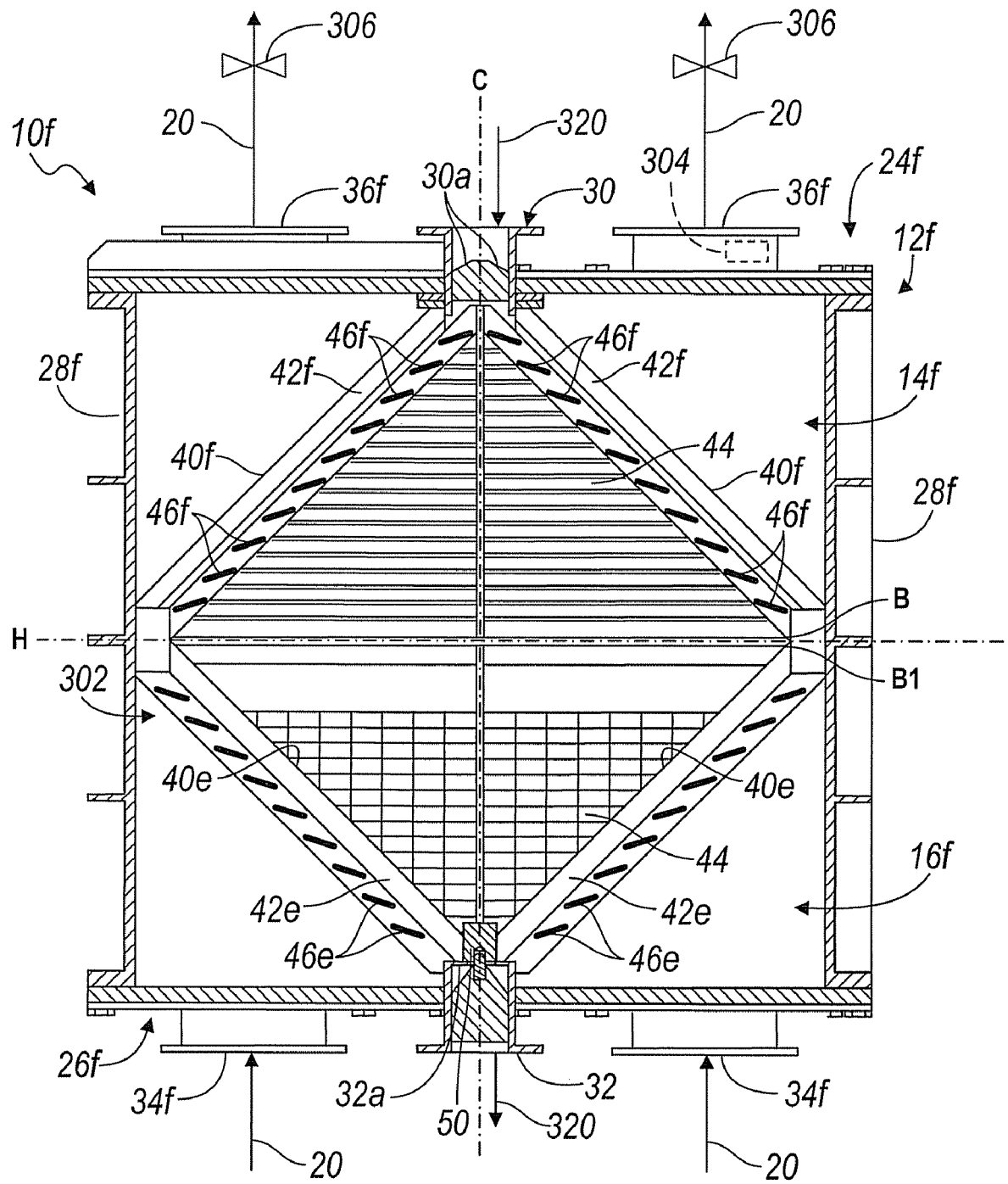
FIG. 10 is a cross-sectional schematic view of the moving bed adsorber of FIG. 6, taken along line 6-6 of FIG. 7.

With reference to FIG. 8, according to various embodiments, a moving bed adsorber 10d can be configured to desorb the contaminant from the resin 22, which can then be collected for condensation and recovery. As the moving bed adsorber 10d of FIG. 8 can be similar to the moving bed adsorber 10b discussed with regard to FIG. 4, only the differences between the moving bed adsorber 10d and the moving bed adsorber 10b will be discussed herein. In this regard, the moving bed adsorber 10d can include a housing 12d, the first bed system 14b and the second bed system 16b.

The housing 12d can include a top section 24d, a bottom section 26d, walls 28d, the divider 100, the resin inlet 30, the resin outlet 32, the first fluid inlets 102, the first fluid outlet 106, at least one recovery fluid inlet 200 and at least one recovery fluid outlet 202.

The at least one recovery fluid inlet 200 can comprise two recovery fluid inlets 200a, 200b, with one recovery fluid inlet 200 per flow channel of the second bed system 16b. The recovery fluid inlets 200 can be annular, and can be coupled to the bottom section 26d. The recovery fluid inlets 200 can receive a hot recovery fluid 204 from a suitable recovery fluid supply 204a. The recovery fluid 204 can generally comprise a heated gas, such as hot air or steam. The recovery fluid 204 can be heated in the fluid supply 204a, or can pass through a heat exchanger prior to reaching the recovery fluid inlets 200. The recovery fluid 204 can be at a temperature suitable to desorb the contaminants from the resin 22 as the recovery fluid 204 flows through the resin 22 in the second bed system 16b.

The at least one recovery fluid outlet 202 can comprise a single recovery fluid outlet, which can enable the recovery fluid 204 to exit the moving bed adsorber 10d. The recovery fluid outlet 202 can be annular, and can be coupled to one of the walls 28d. The recovery fluid outlet 202 can also enable the collection of the contaminates from the second bed system 16b, which can then be collected, cooled and condensed for reuse or disposal.

In operation, the moving bed adsorber 10d can enable the removal or adsorption of contaminates from the fluid stream 20 while also enabling the collection and recovery of the contaminates from a saturated adsorbent, such as the resin 22 in the second bed system 16b. The resin 22 can flow through the first bed system 14b, and remove contaminates from the fluid stream 20, which can be directed into the first bed system 14b by the first fluid inlets 102. The resin 22 can then flow from the first bed system 14b into the second bed system 16b.

Substantially simultaneously, the recovery fluid 204 can flow from the fluid supply 204a into the second bed system 16b at a suitable high temperature. The recovery fluid 204 can be directed by the louvers 46c into contact with the resin 22 contained in the flow channels 42c of the second bed system 16b. When the high temperature recovery fluid 204 contacts the lower temperature resin 22, the contaminants in the resin 22 can evaporate, and thus, be desorbed from the resin 22. Thus, the moving bed adsorber 10d can be bi-functional and can operate to adsorb contaminates in the first bed system 14b, which can then be desorbed from the resin 22 in the second bed system 16b. This can provide a compact assembly, which can be suitable for use with fluid streams 20 that contain contaminates that are easily adsorbed.

Further, it should be noted that in one of various embodiments, with reference to FIG. 6, the moving bed adsorber 10f can operate as a high pressure system, if desired. The moving bed adsorber 10f can enable the continuous flow of resin 22 through the moving bed adsorber 10f. As the moving bed adsorber 10f can be substantially similar to the moving bed adsorber 10, only the differences between the moving bed adsorber 10 and the moving bed adsorber 10f will be discussed in great herein. In this regard, with reference to FIGS. 6-7, a moving bed adsorber 10f can include a housing 12f, a first bed system 14f, a second bed system 16f and a resin control system 300.

The housing 12f can include a top section 24f, a bottom section 26f, at least one wall 28f, the resin inlet 30, the resin outlet 32, at least one fluid inlet 34f and at least one fluid outlet 36f. The housing 12f can be annular or cylindrical in shape, and can be sized and shaped to coordinate with the shape of the first bed system 14f and the second bed system 16f. Generally, the housing 12f can be pressurized, such that the housing 12f acts as a pressure chamber. The housing 12f can be pressurized in any suitable manner, and can generally be maintained at a high pressure. For example, the pressure can range from about atmospheric pressure to about 150 pounds per square inch gauge (psig) or higher.

The top section 24f can be coupled to the resin inlet 30 and the fluid outlets 36, while the bottom section 26f can be coupled to the resin outlet 32 and the at least one fluid inlet 34f. The wall 28f can couple the top section 24f to the bottom section 26f. The first bed system 14f and the second bed system 16f can be positioned within the wall 28f of the housing 12f such that each of the first bed system 14f and the second bed system 16f can be coupled to and in contact with an inner circumference 302 of the wall 28f (FIG. 7).

The at least one fluid inlet 34f can typically comprise four fluid inlets 34f. The fluid inlets 34f can be annular. The fluid inlets 34f can be coupled to the bottom section 26f, and can be spaced substantially evenly about the bottom section 26f to enable an equal distribution of the fluid stream 20 over the second bed system 16f. The fluid inlets 34f can receive the contaminated fluid stream 20 from the fluid supply 20a.

The at least one fluid outlet 36f can typically comprise four fluid outlets 36f. The fluid outlets 36f can be annular. The fluid outlets 36f can be coupled to the top section 24f of the housing 12f such that the fluid outlets 36f can be spaced substantially evenly about the top section 24 of the housing 12f. The fluid outlets 36f can receive the fluid stream 20 after the fluid stream 20 has passed through the second bed system 16f and the first bed system 14f. Depending upon the type of contaminants in the fluid stream 20, the fluid outlets 36f can be coupled to additional fluid conduits, which can direct the cleaned fluid stream 20 to a desired vessel for additional processing or reuse, or could be open to the atmosphere.

In addition, with reference to FIG. 7, one or more of the fluid outlets 36f can include an exhaust analyzer 304 and at least one valve 306. The exhaust analyzer 304 can be in communication with and responsive to the fluid stream 20 exiting through the one or more fluid outlets 36f, and can determine a quantity of the contaminate present in the fluid stream 20. Based on the quantity of the contaminate in the fluid stream 20, the resin control system 300 can adjust the flow rate of the resin 22. The ability to change the resin flow on a continuous basis without changing or removing the resin 22 from the moving bed adsorber 10f is particularly useful for controlling changing conditions in a process or changing emission requirements. The valve 306 can comprise any pressure control valve known in the art, and can generally be used to control the exhausting of the fluid stream 20 from one or more of the fluid outlets 36f of the moving bed adsorber 10f. This is extremely useful as an increase in fluid pressure can increase the ability of the resin 22 to adsorb the contaminate from fluid stream 20.

With reference to FIG. 7, the first bed system 14f can be substantially similar to the first bed system 14 discussed with regard to FIGS. 1-3, except that in this example, the first bed system 14f can be generally conical, with a base B of the first bed system 14f configured to be coupled to and in contact with the inner circumference 302 of the wall 28f. It will be understood, however, that the first bed system 14f can be generally pyramidal in shape, if desired. If the first bed system 14f is conical in shape, then the screen 40f, flow channels 42f and louvers 46f can also be conical in shape. This can reduce the number of stagnant areas of resin flow through the flow channels 42f, and can allow the operation of the moving bed adsorber 10f at various fluid stream 20 flow rates.

If the first bed system 14f is conical in shape, then as discussed, flow channels 42f can take the shape of the first bed system 14f. Since the first bed system 14f is conical, the first bed system 14f can define one flow channel 42f. The flow channel 42f can extend downwardly from the resin inlet 30 to the inner circumference 302 of the wall 28f, and can have a slope that can enable the flow of the resin 22 to approach the plug flow rate. The resin 22 can flow from the first bed system 14f to the second bed system 16f.

The second bed system 16f can be substantially similar to the second bed system 16 discussed with regard to FIGS. 1-3, except that in this example, the second bed system 16f can be generally conical, with a base $B_1$ of the second bed system 16f configured to be coupled to and in contact with the inner circumference 302 of the wall 28f. It will be understood, however, that the second bed system 16f can be generally pyramidal in shape, and can comprise an inverse pyramid if desired. If the second bed system 16f is conical in shape, then the screen 40e, flow channel 42e and louvers 46e can also be conical in shape. This can reduce the number of stagnant areas of resin flow through the flow channel 42e, and can allow the operation of the moving bed adsorber 10f at various fluid stream 20 flow rates.

If the second bed system 16f is conical in shape, then as discussed, flow channels 42e can take the shape of the second bed system 16f. Since the second bed system 16f is conical, the second bed system 16f can define one flow channel 42e. The flow channel 42e can extend downwardly from the inner circumference 302 of the wall 28f to the resin outlet 32, and can have a slope that can enable the flow of the resin 22 to approach the plug flow rate. The resin 22 can flow through the second bed system 16f and can exit the moving bed adsorber 10f through the resin outlet 32.

With reference to FIG. 6, the resin control system 300 can include a resin supply system 310, a resin discharge system 312 and a control system 314. The resin control system 300 can enable the resin 22 to be fed into the moving bed adsorber 10f on a continuous or semi-continuous basis. The resin supply system 310 can include a resin supply vessel 318, a resin supply line 320, a supply valve 322 and a feed valve 324.

The resin supply vessel 318 can be pressurized, and generally, can operate at a pressure equal to the pressure of the housing 12f of the moving bed adsorber 10f. The resin supply vessel 318 can include an inlet 318a for receipt of the resin 22, and can include an outlet 318b. The outlet 318b can be in communication with the resin supply line 320. The resin supply vessel 318 can store fresh or new resin 22, which can be fed into the moving bed adsorber 10f by the resin supply line 320. The resin supply line 320 can be coupled to the outlet 318b of the resin supply vessel 318 and the resin inlet 30 to enable the resin 22 to flow from the resin supply vessel 318 into the first bed system 14f.

The supply valve 322 can coupled to the outlet 318b, and can be responsive to the control system 314 to control the flow of resin 22 through the resin supply line 320. For example, the supply valve 322 can be activated by the control system 314 to enable the resin 22 to flow into the moving bed adsorber 10f. The feed valve 324 can be coupled to the inlet 318a of the resin supply vessel 318 to enable the depressurization of the resin supply vessel 318. The depressurization of the resin supply vessel 318 can draw additional new resin 22 into the resin supply vessel 318.

The resin discharge system 312 can include a resin discharge vessel 326, a resin discharge line 328, a discharge valve 330 and an outlet valve 332. The resin discharge vessel 326 can be pressurized, and generally, can operate at a pressure equal to the pressure of the housing 12f of the moving bed adsorber 10f. The resin discharge vessel 326 can include an inlet 326a for receipt of the resin 22 from the moving bed adsorber 10f, and can include an outlet 326b. The outlet 326b can be in communication with a resin handling system 325, which can direct the used resin 22 offsite for regeneration, or can direct the resin 22 directly into a regeneration apparatus. The resin discharge vessel 326 can store adsorbed, spent or used resin 22, which can be received from the moving bed adsorber 10f by the resin discharge line 328.

The resin discharge line 328 can be coupled to the resin outlet 32 of the moving bed adsorber 10f and the inlet 326a to enable the resin 22 to flow from the second bed system 16f into the resin discharge vessel 326. The discharge valve 330 can coupled to the resin outlet 32, and can be responsive to the control system 314 to control the flow of resin 22 through the resin discharge line 328. For example, the discharge valve 330 can be activated by the control system 314 to enable the resin 22 to flow from the moving bed adsorber 10f to the resin discharge vessel 326. The outlet valve 332 can be coupled to the outlet 326b of the resin discharge vessel 326 to enable the depressurization of the resin discharge vessel 326. The depressurization of the resin discharge vessel 326 can draw the spent resin 22 from the resin discharge vessel 326.

The control system 314 can be in communication with and responsive to the exhaust analyzer 304 to receive a data signal 327 indicative of the amount of contaminate present in the fluid stream 20 exhausted through the fluid outlets 36f. The control system 314 can also be in communication with the supply valve 322, the feed valve 324, the discharge valve 330 and the outlet valve 332 to enable one or more of the supply valve 322, the feed valve 324, the discharge valve 330 and/or the outlet valve 332 to open to enable the resin 22 to move to/from the moving bed adsorber 10f. For example, based on the data signal 327 from the exhaust analyzer 304, the control system 314 can open the supply valve 322 and the discharge valve 330 to enable new resin 22 to flow from the resin supply vessel 318 into the moving bed adsorber 10f as the spent resin 22 flows from the moving bed adsorber 10f into the resin discharge vessel 326. This can enable cycling of the resin 22 without stopping the flow of the fluid stream 20 and/or stopping the operation of the moving bed adsorber 10f. In addition, with the supply valve 322 and the discharge valve 330 closed, the control system 314, based on a selected time period or a user input, for example, can open the feed valve 324 and the outlet valve 332 to enable the addition of new resin 22 to the resin supply vessel 318 and the removal of spent resin 22 from the resin discharge vessel 326. This can also be completed with no change in the flow of the fluid stream 20, or without halting the operation of the moving bed adsorber 10f.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A moving bed system for removing contaminates from a fluid stream comprising: a pressurized housing maintained at a pressure greater than atmospheric pressure; a first bed system disposed in the housing and coupled to the housing, the first bed system including at least one first flow channel with a downward slope along the entire length of the at least one first flow channel that enables an adsorbent material to flow through the first bed system; a second bed system disposed in the housing and including at least one second flow channel with a downward slope along the entire length of the at least one second flow channel, the at least one second flow channel in fluid communication with the first bed system to receive the adsorbent material from the first bed system, the at least one second flow channel of the second bed system being symmetrical to the at least one first flow channel of the first bed system about a horizontal axis defined through the housing; a divider that separates the first bed system from the second bed system, the divider enables the adsorbent material to flow between the first bed system and the second bed system, but prevents the fluid stream from flowing between the first bed system and the second bed system; and wherein the first bed system and the second bed system direct a first portion of the fluid stream into contact with the adsorbent material of the at least one first flow channel of the first bed system at least twice and a second portion of the fluid stream into contact with the absorbent material of the at least one second flow channel of the second bed system at least twice to remove the contaminates from the fluid stream.

2. The system of claim 1, wherein the housing further comprises:
a top surface that includes at least one first fluid inlet and at least one adsorbent material inlet;
a bottom surface that includes at least one adsorbent material outlet and at least one second fluid inlet;
at least one wall that couples the top surface to the bottom surface, the at least one wall including at least one first fluid outlet and at least one second fluid outlet; and
wherein the at least one flow channel of the first bed system is in fluid communication with the at least one adsorbent material inlet to receive the adsorbent material, and the at least one flow channel of the second bed system is in fluid communication with the at least one adsorbent material outlet to discharge the adsorbent material from the housing.

3. The system of claim 2, wherein the first bed system further comprises:
a screen adapted to prevent the adsorbent material from exiting the at least one flow channel;
a plurality of louvers adapted to direct the fluid stream through the adsorbent material, the plurality of louvers in fluid communication with the at least one first fluid inlet; and
wherein the first bed system defines a cavity through which the fluid stream flows to pass through the at least one flow channel at least twice, and the screen is positioned adjacent to the cavity, opposite the plurality of louvers such that the at least one flow channel of the first bed system is defined between the screen and the plurality of louvers.

4. The system of claim 3, wherein the second bed system further comprises:
a screen adapted to prevent the adsorbent material from exiting the at least one flow channel;
a plurality of louvers adapted to direct the fluid stream through the adsorbent material, the plurality of louvers in fluid communication with the at least one first fluid inlet; and
wherein the second bed system is symmetrical to the first bed system about the horizontal axis, the second bed system defining a cavity through which the fluid stream flows to pass through the at least one flow channel at least twice, and the screen is positioned adjacent to the cavity, opposite the plurality of louvers such that the at least one flow channel of the second bed system is defined between screen and the plurality of louvers.

5. The system of claim 4, further comprising:
a recovery fluid supply in fluid communication with the at least one second fluid inlet, the recovery fluid supply operable to provide a recovery fluid at a high temperature to the second bed system to desorb the containments collected by the adsorbent material; and
wherein the recovery fluid exists the second bed system via the at least one second fluid outlet.

6. The system of claim 4, wherein the first bed system and the second bed system are V-shaped such that the screen and plurality of louvers are V-shaped.

7. A moving bed system for removing contaminates from a fluid stream comprising: a housing having a top surface, a bottom surface and at least one wall, the top surface including at least one fluid outlet and at least one adsorbent material inlet, the top surface coupled to the bottom surface via the at least one wall, the at least one wall including at least one fluid inlet, the bottom surface including at least one adsorbent material outlet; a first bed system disposed in the housing and coupled to the at least one wall of the housing, the first bed system including a screen, at least one flow channel and a plurality of louvers, the at least one flow channel having downward slope along the entire length of the at least one first flow channel and in fluid communication with the adsorbent material inlet to receive an adsorbent material, the at least one first flow channel enable the adsorbent material to flow through the first bed system, the plurality of louvers directs the fluid stream through the adsorbent material, and the screen prevents the adsorbent material from exiting the at least one first flow channel, the first bed system defining a cavity through which the fluid stream flows, with the plurality of louvers positioned adjacent to the cavity and the screen positioned opposite the plurality of louvers such that the at least one first flow channel is defined between the screen and the plurality of louvers; a second bed system disposed in the housing and including at least one second flow channel having a downward slope along the entire length of the at least one second flow channel in fluid communication with the first bed system to receive the adsorbent material from the first bed system, the at least one second flow channel of the second bed system symmetrical to the at least one first flow channel of the first bed system about a horizontal axis defined through the housing, the at least one flow channel of the second housing in fluid communication with the at least one adsorbent material outlet, the second bed system in fluid communication with the at least one fluid inlet; and wherein the fluid stream is directed through the second bed system and the first bed system such that the fluid stream passes through the adsorbent material twice prior to exiting the at least one fluid outlet.

8. The system of claim 7, wherein the housing is pressurized and maintained at a pressure greater than atmospheric pressure.

9. The system of claim 7, wherein the plurality of louvers of the first bed system are each positioned at an angle of about 20 to about 40 degrees relative to the horizontal axis.

10. The system of claim 7, wherein the second bed system defines a second cavity through which the fluid stream flows and the second bed system further comprises:
a second plurality of louvers positioned adjacent to the second cavity to direct the fluid stream into the at least one second flow channel;
a second screen positioned opposite the second plurality of louvers to define the at least one second flow channel between the second screen and the second plurality of louvers; and wherein each louvers of the plurality of louvers is positioned at an angle between about negative 20 degrees and about negative 40 degrees relative to the horizontal axis.

11. The system of claim 10, wherein the first bed system and second bed system are pyramidal in shape such that the screen and plurality of louvers are pyramidal in shape.

12. The system of claim 10, wherein the first bed system and second bed system are conical in shape such that the screen and plurality of louvers are conical in shape.

13. The system of claim 10, wherein the housing is cylindrical in shape.

* * * * *